United States Patent
Najafi et al.

(10) Patent No.: US 8,949,955 B2
(45) Date of Patent: Feb. 3, 2015

(54) METHOD AND APPARATUS FOR MOBILE TIME-BASED UI FOR VIP

(75) Inventors: Maryam Najafi, San Jose, CA (US); Len Osamu Toyoshiba, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 1347 days.

(21) Appl. No.: 12/260,997

(22) Filed: Oct. 29, 2008

(65) Prior Publication Data

US 2010/0107229 A1    Apr. 29, 2010

(51) Int. Cl.
| | |
|---|---|
| *H04L 9/32* | (2006.01) |
| *H04L 29/06* | (2006.01) |
| *G06F 21/35* | (2013.01) |
| *H04L 9/08* | (2006.01) |
| *H04W 12/06* | (2009.01) |

(52) U.S. Cl.
CPC ............ *H04L 63/0838* (2013.01); *G06F 21/35* (2013.01); *H04L 9/0869* (2013.01); *H04L 9/3213* (2013.01); *H04L 9/3228* (2013.01); *H04W 12/06* (2013.01); *H04L 2209/80* (2013.01)
USPC .......................................................... 726/6

(58) Field of Classification Search
CPC ..... G06F 21/35; H04L 9/0869; H04L 9/3213; H04L 63/0838; H04L 9/3228; H04L 2209/80; H04W 12/06
USPC .............. 726/9, 26, 27, 28, 29; 713/224, 201, 713/212, 213, 220, 223; 709/204, 201, 220, 709/227; 707/600, 607, 608, 609, 687, 821; 380/200, 201, 202, 293, 227
See application file for complete search history.

(56) References Cited

U.S. PATENT DOCUMENTS

| | | | |
|---|---|---|---|
| 2003/0105964 | A1 | 6/2003 | Brainard et al. |
| 2005/0166263 | A1 | 7/2005 | Nanopoulos et al. |
| 2007/0174904 | A1 | 7/2007 | Park |
| 2007/0234063 | A1 | 10/2007 | Ueda et al. |
| 2010/0180328 | A1 * | 7/2010 | Moas et al. ........... 726/6 |
| 2010/0299731 | A1 * | 11/2010 | Atkinson ............ 726/6 |

OTHER PUBLICATIONS

International Search Report and Written Opinion of PCT Application No. PCT/US09/62588, mailed Dec. 10, 2009.

* cited by examiner

*Primary Examiner* — Brandon Hoffman
*Assistant Examiner* — Nega Woldemariam
(74) *Attorney, Agent, or Firm* — Lowenstein Sandler LLP

(57) ABSTRACT

A method and apparatus for time-based one-time password generation using a wireless communications device for two-factor authentication are described. The computer-implemented method comprising detecting launch of a security code generation application on a wireless communications device, generating a first unique security code upon launching the application, displaying the first security code on the wireless communications device, determining based on time whether to generate a new unique security code, and displaying the new unique security code.

26 Claims, 7 Drawing Sheets

FIG. 3A
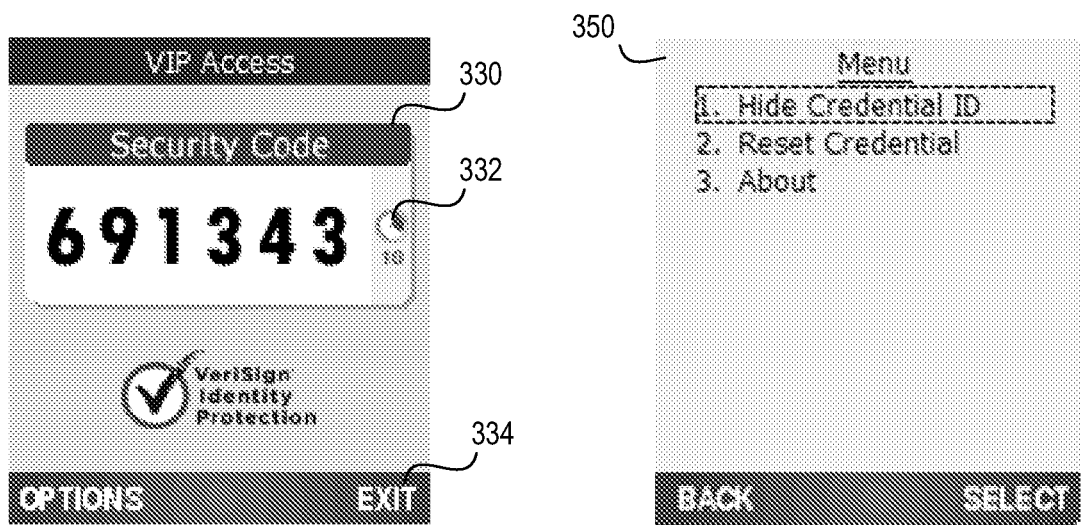
FIG. 3B
FIG. 3C

METHOD AND APPARATUS FOR MOBILE TIME-BASED UI FOR VIP

FIELD OF THE INVENTION

The present invention relates to the field of authentication. More particularly, embodiments of the present invention relate to time-based one-time security code generation using a wireless communications device for two-factor authentication.

BACKGROUND

Authentication tools provide the ability to determine the identity of a party to an interaction and to ensure that a message came from who it claims to have come from. Authentication can be used as the basis for authorization (determining whether a privilege will be granted to a particular user or process). For example, when a bank client wishes to access a bank account from an automated teller machine (ATM), authentication is used to determine the client's authorization to access a particular bank account.

An authentication factor is a piece of information used to authenticate or verify a person's identity for security purposes. Authentication factors can be classified as something a user is or does, something a user knows, and something a user has. For example, something a user is or does includes a fingerprint or retinal pattern, DNA sequence, signature or voice recognition. Something a user knows may be a password, pass phrase, or personal identification number (PIN). Something a user has may be an ID card, security token, software token, phone, or mobile phone.

Traditional authentication schemes use a one-factor system that authenticates users using only, for example, something a user knows, such as a username and password pair. This one-factor system provides minimal security, because many user passwords are very easy to guess.

Two-factor authentication (TFA) is a system wherein two different factors are used to for authentication. Using more than one factor is sometimes called strong authentication. Using two factors as opposed to one delivers a higher level of authentication assurance. For example, a first authentication factor may be a user's username and password already registered at a third party website, for example, www.bank.com. The password provides the something you know component. A second factor may be something the user has. In the most common implementations of two-factor authentication, the something you have component may be a small security token. These tokens can take many form factors, including but not limited to key rings and credit card-sized cards. A security token card is a compact electronic device which displays a number on a small screen. With a security token card, a user will still enter their username and password at sign-in, but in addition to that, a user will also enter a 6-digit random numeric code that appears on their token. By entering this number into the system when a user attempts to authenticate (login), a user proves that that he/she is in possession of the card.

Implementation of two-factor authentication may include one-time passwords (OTP). Using one-time passwords require a user to generate and use a different OTP each time a user attempts a login. Traditionally static passwords can more easily be accessed by an unauthorized intruder given enough attempts and time. The use of one-time passwords make it difficult for passwords to be sniffed and stolen and then re-used. By constantly altering the password, the risk of unauthorized access can be greatly reduced. For example, a number displayed on a small token card can change frequently, usually every 30 or 60 seconds. The system which a user is authenticating to knows the number which should be on the small token card. If the numbers match and a user's password is correct, a user is authenticated.

There are basically three types of one-time passwords: event-based OTP, time-based OTP, and challenge-based OTP. Event-based security tokens generate a new code whenever a button is pressed on the token. At each authentication, a validation server ticks onto the next code in the sequence and a user is directed to press a button on the security token to get a new code. If the code entered matches the code on the server, authentication is granted. The server and the token both started with the same 'seed' or 'shared secret', from which the subsequent codes are generated, and the button presses are presumably synchronized.

Event-based tokens are less secure than time-based tokens, as the codes they generate are valid until they are used. If a hacker acquires a code from an event-based token, and also has the victim's password, the hacker has unauthorized access to the victim's resources until the victim attempts to use the code, or the hacker logs out. An improvement over event-based OTP scheme is the time-based password scheme. Time-based passwords are based on the current time and a valid for a short period. The security code generated is usually a random number based on a shared seed (shared secret information) with a validation server. At regular time intervals, for example, 30 or 60 seconds, the token uses an algorithm that is generally unique to each token, to generate a new security code based on the time. The functionality of this system depends on the accuracy and synchronization of the clocks in the token and the validation server, as well as a common random number seed. As with the event-based tokens, this code is entered alongside a password to gain authentication.

SUMMARY OF THE INVENTION

A method and apparatus for time-based one-time password generation using a wireless communications device for two-factor authentication are described. The computer-implemented method comprises detecting launch of a security code generation application on a wireless communications device, generating a first unique security code upon launching the application, displaying the first security code on the wireless communications device, determining based on time whether to generate a new unique security code, and displaying the new unique security code.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A illustrates an exemplary GUI for displaying security code information, in accordance with one embodiment of the invention;

FIG. 3B illustrates an exemplary GUI for displaying security code information, in accordance with one embodiment of the invention;

FIG. 3C illustrates an exemplary GUI for displaying security code information, in accordance with one embodiment of the invention;

DETAILED DESCRIPTION

The method and apparatus described are for two-factor authentication using a communications device. The time-based one-time passwords are displayed using a communications device. In one embodiment, the communications device is a wireless communications device.

Figure 1:
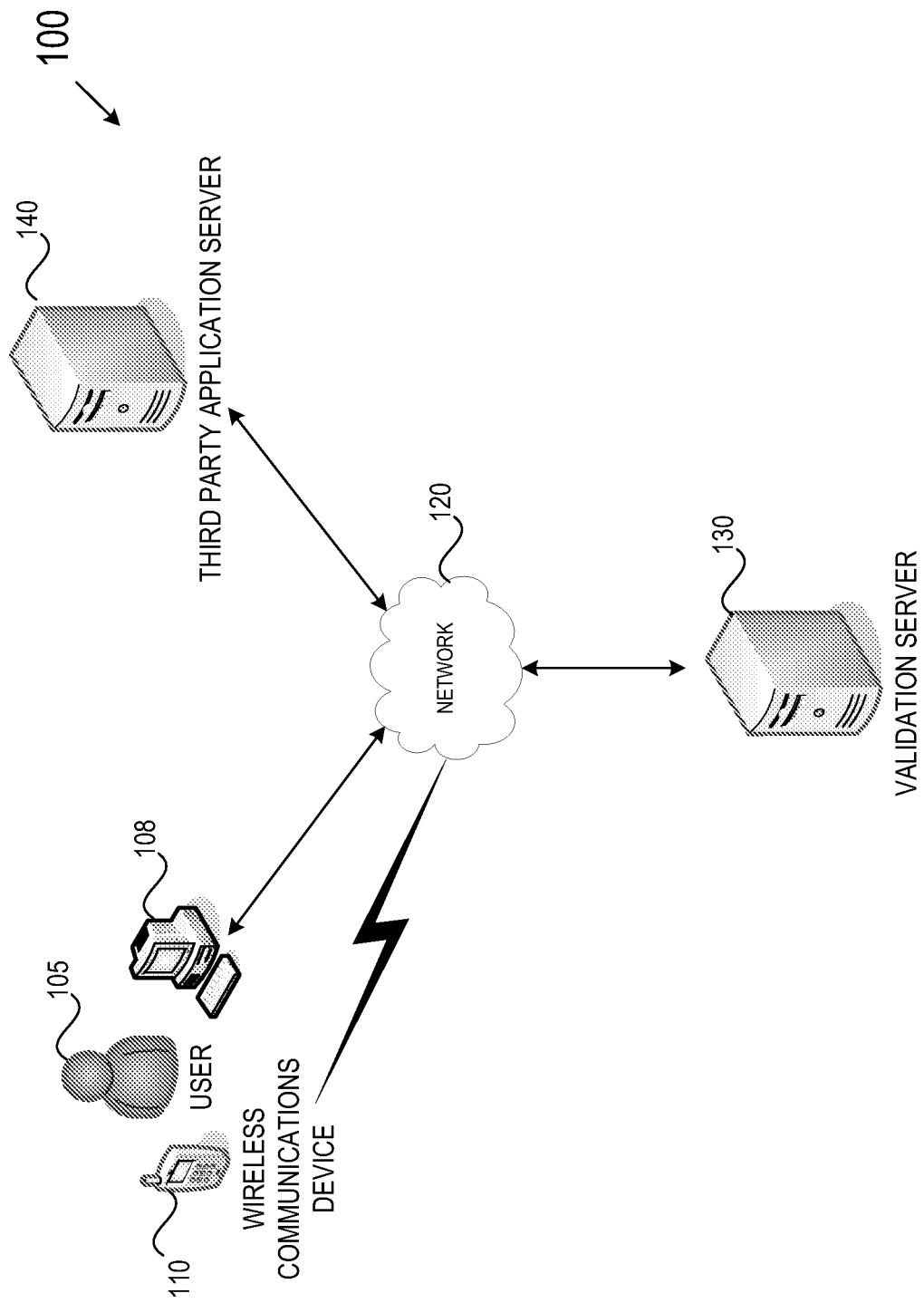
FIG. 1 is one embodiment of a network on which the present invention may be implemented.

FIG. 1 is an overview of one embodiment of a network on which the present invention may be implemented. The network 120 may be any type of wired and/or wireless network. For example, the network 120 may be a wireless computer network, such as a wireless Local Area Network (LAN), Wireless Fidelity (IEEE 802.11X wireless networking), cellular network (GSM, G3, etc.), or other type of network. Note that the network connection type is not relevant, as the present invention may work with any network connection/standard.

As illustrated in FIG. 1, user 105 can use network 100 to log into a secure website hosted by third party 140 while browsing the Internet using, for example, computer 108. Alternatively, user 105 can log into a secure website while browsing the Internet using a mobile device, such as a handheld device, wireless communications device 110, mobile phone, or any other device that can connect to the Internet. For example, user 105 can login into www.bank.com to view his/her online bank account, or user 105 can login to his/her company's virtual private network (VPN). Using one-factor authentication, the user would log-in using simply a username and password already registered at www.bank.com. Whereas, to log-in using the stronger two-factor authentication, user 105 enters a one-time password (OTP) in addition to a username and password. This enables two-factor authentication (TFA), that is, "what you know," e.g., the password, and "what you have," e.g., the OTP.

In one embodiment, the user 105 downloads and installs a time-based one-time password generation application (i.e., a security code generation application) onto wireless communications device 110. In another embodiment, the application may be pre-installed on the device. In another embodiment, the device may be a special purpose device for providing the security codes. The security code generation application generates unique one-time passwords (i.e., security codes). Wireless communications device 110 may be, for example, a mobile phone, PDA, portable computer, gaming device, or media player. For simplicity, the description below uses a mobile phone. However, the techniques described herein are applicable to any wireless communications device which can connect to validation server 130.

To download and install the security code generation application, user 105 may connect through wireless communications device 110 to the Internet. Alternatively, user 105 may download the security code generation application to wireless communications device 110 by connecting wireless communications device 110 to the Internet via computer 108 or via other means. Alternatively, the security code generation application may be pre-installed, installed from an installation disk, or otherwise placed onto device 110.

Prior to using the security code generation application, user 105 activates the security code generation application, in one embodiment with a validation service hosted on validation server 130. Validation service may be hosted on one or more validation servers. In one embodiment, the validation server 130 may comprise multiple distributed validation servers, load-balanced servers, or any other system that is accessible to a user via a direct connection or network. A validation service provides and manages the secure infrastructure supporting the use of security codes generated by the security code generation application over network 100. In one embodiment, a validation service validates each use of a security code.

Prior to using the security code generation application installed wireless communications device 110, user 105 must also register with a third party to enable two-factor authentication. For example, user 105 can register with a bank to enable two-factor authentication for accessing his/her online bank account. Similarly, an employer of user 105 may have registered user 105 to login into the company VPN using two-factor authentication. In one embodiment, a standard registration with a third party can be converted into a two-factor authentication registration. In one embodiment, such conversion may be automatic.

As a registered TFA user, each time user 105 wishes to login into his/her online bank account or access the company's VPN, user 105 logs in using the security code generated by the security code generation application. For example, in one embodiment user 105 will enter a username and password (e.g., "what you know") into a third party's login website, third party (e.g. Bank) will determine that the account is a TFA account, and request user 105 to enter a second authentication factor (e.g., "what you have"), for example, the security code generated by the security code generation application installed on wireless communications device 110. In another embodiment, the bank or other destination may automatically display the TFA authentication, enabling the user to log in at once by entering a password and security code.

To retrieve a time-based one-time password (security code), in one embodiment user 105 launches the security code generation application on wireless communications device 110. In one embodiment, the security code generation application may be automatically launched. Upon launch, the application generates and displays a unique security code. The security code generation application generates a unique security code, and updates the display until user 105 exits the application. In one embodiment, the display is updated every 30 seconds.

User 105 enters the currently displayed security code into the third party (e.g., bank) website. Third party application server 140 sends the information to validation server 130 over network 120. Validation server 130 receives the information and determines whether the security code is a correct and current code, using the information associated with user 105.

Once validation server 130 has ascertained the identity of user 105 with a high degree of certainty (using two factors), third party application server 140 can provide user 105 access to the requested resource (e.g., online bank account or company VPN).

Figure 2:
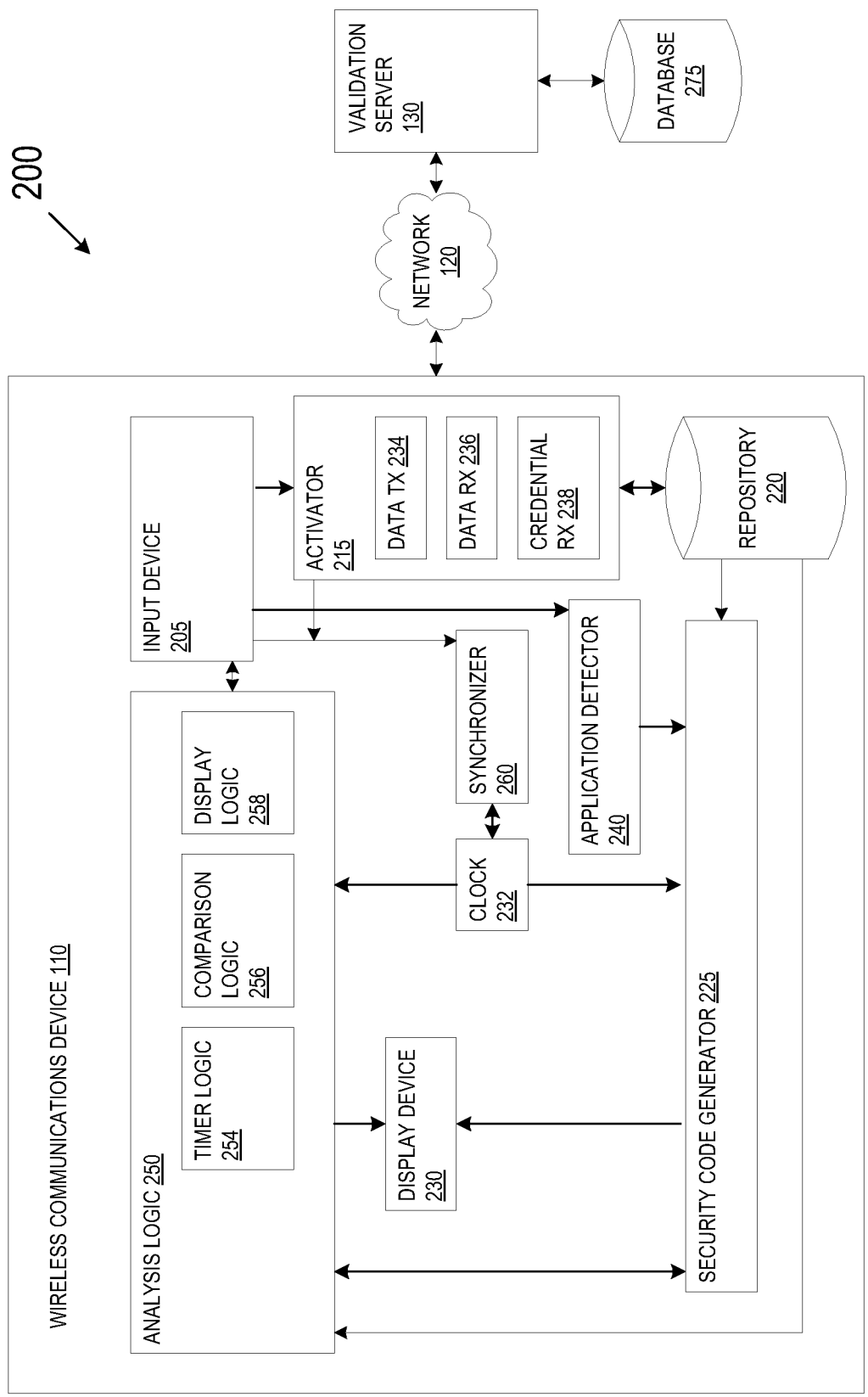
FIG. 2 is a block diagram of one embodiment of a wireless communications device.

FIG. 2 is a block diagram of one embodiment of a wireless communications device. In one embodiment, the wireless communications device 110 is a wireless cellular phone, or cell phone, and also known as mobile phone, connected to a wireless network 120. In another embodiment, the wireless communication device 110 may be another mobile device which can connect via a wireless connection such as WiFi, mobile phone network, Bluetooth, or another wireless connection to another device or network. Alternatively, the communications device may be a wired device (e.g. a device which establishes a connection through being plugged into a computer or other network device).

In one embodiment, the wireless communications device includes an input device 205. Examples of input device 205 include a key pad, a touch screen, or audio input, or any other input for a wireless communications device.

Security Code Generation Application Activation

As earlier described, prior to using the security code generation application, the security code generation application is activated with a validation service hosted on validation server 130. In one embodiment, wireless communications device 110 includes activator 215 to activate the security code generation application with a validation service. In one embodiment, activator 215 receives input from input device 205 to initiate an activation process. Alternatively, activator 215 may automatically initiate the activation process during installation of the security code generation application on wireless communications device 110. In another embodiment, the security code generation application is pre-activated before it is installed, and no activation is necessary. In one embodiment, the activation is only initiated when a secure connection is established between the device and the server.

During activation, in one embodiment after a secure connection is established, the wireless communications device receives a shared secret (secret information) from validation server 130. In one embodiment, a one-time key is used to establish to secure connection. Activator 215 includes data transmitter 234 ("DATA TX") and data receiver 236 ("DATA RX"). Data transmitter 234 in one embodiment sends information from wireless communications device 110 to validation server 130. Data receiver 236 receives shared secret information from validation server 130. Shared secret information is a unique identifier used in generating security codes. In one embodiment, the shared secret information is a seed, used to generate unique security codes. An algorithm uses the seed to generate a shared secret. In other words, both the validation service and wireless communications device 110 know the same algorithm and the same seed to calculate the next security code. That ensures that both the validation server and wireless communications device 110 know the same identifier for each generated security code. By sharing secret information, validation server 130 can validate the security code generated by wireless communications device 110. In one embodiment, the server and mobile device use related applications, such that the data acts as a private-public key pair, rather than a shared secret.

When wireless communications device 110 receives the secret information from validation server 130, wireless communications device 110 securely stores (e.g., encrypts) the shared secret. Wireless communications device 110 includes repository 220 to securely store information. The information stored in repository 220 may be secured by encryption.

Credential Identifier (ID)

In one embodiment, activator 215 includes credential receiver 238 ("CREDENTIAL RX") to receive a credential identifier (ID) from validation server 130. In one embodiment at activation, in addition to receiving shared secret information from validation server 130, wireless communications device 100 receives a credential ID. A credential ID is used as an identifier and is assigned to a specific user (in one embodiment a specific user's particular wireless communications device).

For illustrative purposes, a credential ID can be analogized to a credit card number. For example, when a user uses a security code, the credential ID associated with that user allows validation server 130 to validate the security code in the system for that particular credential ID. Thus, when validation server 130 validates the security code it knows which credential ID the security code belongs to. Validation server 130 may securely store information, such as information associating a user or a user's wireless communications device to a credential ID, shared secret information, time thresholds, etc. in database 275.

When a user attempts to register at a third party's secured website using TFA, in one embodiment a user can provide the credential ID and a one-time security code to register the credential When a user successfully registers with the third party, the third party associates the credential ID with the user and stores the association.

Clock Synchronization

In one embodiment, security codes are generated based on shared secret information and the current time. In one embodiment, wireless communications device 110 includes clock 232 and synchronizer 260. In one embodiment, during the activation process, clock synchronization is automatically initiated to synchronize clock 232 on the wireless communications device 110 with a clock on validation server 130.

In one embodiment, wireless communications device 110 includes a reset function which causes the process to synchronize the clock 232 on the device with the clock on validation server 130 independently of the activation process. For example, a user may replace the battery of wireless communications device 110 and clock 232 may not reset itself. A user can initiate a re-synchronization of clock 232 with the clock on validation server 130. Furthermore, over time clock skew can create differences in the clocks of the device and the server. Since the clock data is used to generate the one time code, the two clocks should be synchronized.

Synchronizer 260 may receive input from input device 205 to initiate the synchronization process and synchronizes clock 232 with the clock on validation server 130. Synchronizer 260 communicates with validation server 130 to retrieve validation server's time. Synchronizer 260 updates clock 232 to match validation server's time.

In one embodiment, when a connection is successfully established with the validation server, the synchronizer is triggered. In one embodiment, synchronization is triggered after each attempt to authenticate, whether successful or not.

Security Code Generation

In one embodiment, wireless communications device 110 includes application detector 240 to detect a launch of a security code generation application. For example, application detector 240 may detect the launch of the security code generation application based on receiving input from input device 205, such as when a user selects the application from a mobile phone menu.

Application detector 240 may also detect, (e.g., based on receiving input from input device 205), termination of the security code generation application. As earlier described, security code generation application generates and displays new unique security codes periodically until a user exits from the application. In one embodiment, a new security code may be generated every 30 seconds.

Wireless communications device 110 includes security code generator 225 to generate security codes and display device 230 to display a security code. Security code generator 225 can generate a security code based on the launch of the security code generation application. Application detector 240 detects the security code generation application is launched and passes this information to security code generator 225.

As earlier described, security code generation application generates unique security code, in one embodiment based on shared secret information received from the validation service during activation and time. Security code generator 225 retrieves the securely stored shared secret information from repository 220. Security code generator also retrieves the current time from clock 232. Security code generator 225 uses the shared secret information and current time to generate a security code. The security code is displayed on display device 230.

Timer 254 starts when the security code is displayed. In one embodiment, timer 254 provides a visual display of the time elapsing to the user. In one embodiment, the visual display may be a small clock face, with a hand going around. In one embodiment, the visual display may be an hourglass with sand running through it. Other visual displays indicating the time remaining with the currently generated security code may be used.

In one embodiment, timer logic 245 triggers the calculation of a new security code, when the timer indicates that the currently displayed security has expired, or is about to expire. In one embodiment, the timing is such that the new code is generated just as the old code expires.

FIG. 3A and FIG. 3B illustrate exemplary GUIs for displaying a security code, in accordance with one embodiment of the invention. As seen in FIG. 3A, a security code 310 is displayed. In one embodiment, wireless communications device 110 displays security code header 308 labeled "Security Code" with a six-digit security code 310 directly beneath header 308. As earlier described, a security code is generated when the security generation application is launched.

Returning to FIG. 2, security code generator 225 may also generate a new security code based on time, for example, every 30 seconds. As earlier described, security codes generated by security code generation application are time-based one-time passwords, meaning each security code is valid for a period of time. By constantly altering the password, as is done with time-based one-time passwords, the risk of access by an unauthorized intruder can be reduced. In the above example, a currently displayed security code would expire after 30 seconds have elapsed.

Wireless communications device 110 includes analysis logic 250 to determine whether to generate a new security code based on time. Analysis logic 250 includes timer logic 254 and comparison logic 256 to determine whether a predefined time threshold is met. Timer logic 254 monitors whether a preset amount of time has elapsed from when a security code was last generated. The preset time may be securely stored in repository 220.

Analysis logic 250 using timer logic determines when to generate a new security code. In one embodiment, the predefined time threshold is set to 30 seconds, and the system displays a new security code every 30 seconds. In one embodiment, analysis logic 240 instructs security code generator 225 to generate a new security code just before the expiration of the time threshold. Security code generator 225 generates a new security code and the system displays the new security code on display device 230.

In one embodiment, a time remaining until the predefined time threshold is met is displayed on display device 230. In another embodiment, a time elapsed since the code was generated is displayed on display device 230.

FIG. 3A and FIG. 3B illustrate exemplary GUIs for displaying a time remaining, in accordance with one embodiment of the invention. In one embodiment, the time remaining is displayed in seconds. Timer indicator 312 is a visual indicator of the valid time remaining for a security code currently displayed. In one embodiment, timer indicator 312 is a circle initially filled with a color which "empties" in a counterclockwise direction as time elapses. When the circle is empty, a new code is displayed. In other embodiments, other visual indicators can be used (e.g., different patterns, different shading, different shapes, etc.). In a preferred embodiment, timer indicator 312 includes a numeric counter directly beneath the circle to indicate the number of seconds remaining before the current security code expires. In a preferred embodiment, timer indicator 312 is located to the right of six-digit security code 310. For example, as seen in FIG. 3A, timer indicator 312 shows 18 seconds are remaining and in FIG. 3B, timer indicator 332 displays 10 seconds are remaining.

In one embodiment, wireless communications device 110 displays a credential identifier (credential ID). Returning to FIG. 2, analysis logic 240 includes display logic 258 to determine whether to display the credential ID. In one embodiment, a credential ID is displayed by default.

As earlier described, a credential ID is received from a validation server during an activation process. The credential ID may be stored in repository 220. Analysis logic 250, using the determination from display logic 258, may retrieve the credential ID from repository 220 and send it to display device 230 to be displayed. FIG. 3A illustrates an exemplary GUI for displaying a credential ID, in accordance with one embodiment of the invention. As seen in FIG. 3A, credential ID 314 is displayed. In a preferred embodiment, credential ID 314 includes a credential ID header 316 labeled "Credential ID" with a unique credential ID 314 directly beneath header 316. In a preferred embodiment, credential ID 314 is located at the top of display device 230. In a preferred embodiment, security code 310 is visually larger than credential ID 314 and security code 310 is located in the center of display device 230.

Returning to FIG. 2, display logic 258 may receive input from input device 205 to hide a credential ID. For example, in FIG. 3A, a user may select options 318. In turn, wireless communications device 110 presents a hide/show credential ID interface, for example, as seen in FIG. 3C. In FIG. 3C, option 350 to hide credential ID is presented. In a preferred embodiment, hide/show credential ID is a toggle option. When an input to hide the credential ID is received, only security code 330 and time remaining 332 are displayed, as seen in FIG. 3B. The figure further illustrates one embodiment of enabling a user to reset the credential. The "Reset credential" option, in one embodiment, triggers clock synchronization with the server. In one embodiment, the user resets the credential for each registration with a third party site, e.g. each third party site associates a unique credential with the user.

Figure 4A:
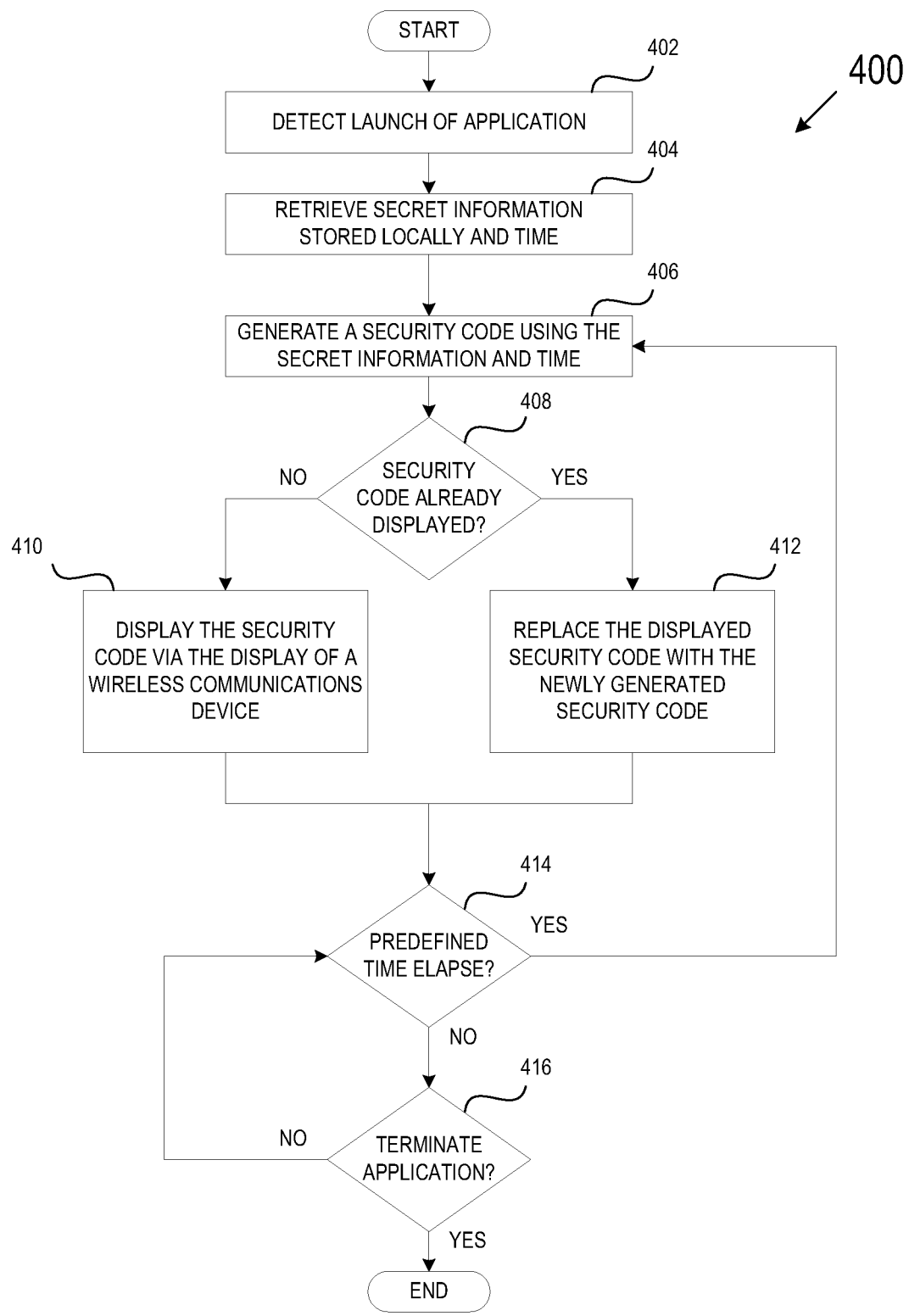
FIG. 4A is an overview flowchart of one embodiment of generating security codes on a wireless communications device.

FIG. 4A is an overview flowchart of one embodiment of generating security codes on a wireless communications device. At block 402, launch of a security code generation application on a wireless communications device is detected. For example, a user may launch the application by selecting a menu on a mobile phone or by powering on a mobile phone.

At block 404, shared secret information is retrieved. Security codes are generated using shared secret information and time. As earlier described, during activation shared secret information is received from the validation server and securely stored on the wireless communications device. At block 404, a time is also retrieved from the internal clock of the wireless communications device.

At block 406, a security code is generated using the shared secret information and time.

At decision 408, the process determines whether a security code is already displayed on the wireless communications device. If no security code is currently displayed on the wireless communications device, the security code generated at block 406 is displayed at block 410. At decision 408, if a security code is currently being displayed on the wireless communications device the process continues to block 412.

At block 412, the security code currently displayed is removed and replaced with the new unique security code generated at block 406 on the display device.

At decision 414, the process determines whether a predefined time has elapsed. In one embodiment, the predefined time is 30 seconds. At decision 414, if a preset time has elapsed, the process returns to generating a new security code at block 406. If a preset time has not elapsed, the process continues to decision 416.

At decision 416, the process determines whether to terminate the security code generation application. In one embodiment, the security code generation application is terminated when a user input to terminate the security code generation application is received. For example, in FIG. 3A and FIG. 3B, a user can terminate the security code generation application by selecting exit option 320 in FIG. 3A or exit option 334 in FIG. 3B.

At decision 416, if a user input to terminate the security code generation application is not received, the process returns to determining whether a predefined time has elapsed at decision 414. At decision 416, if a user input to terminate the security generation application is received, the process ends.

Figure 4B:
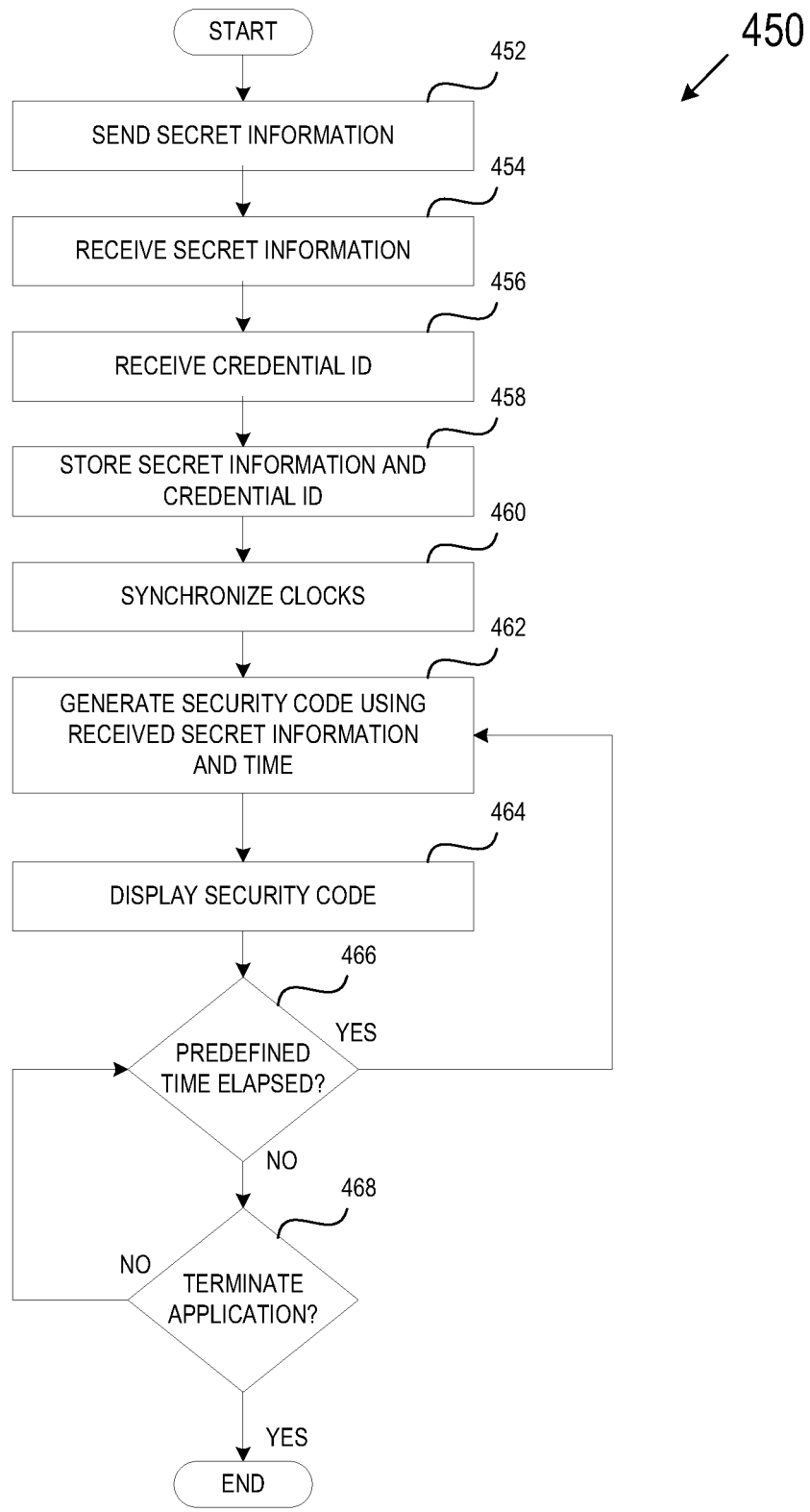
FIG. 4B is an overview flowchart of one embodiment of generating security codes on a wireless communications device including one embodiment of an activation process.

FIG. 4B is an overview flowchart of one embodiment of generating security codes on a wireless communications device including one embodiment of an activation process.

As earlier described, in one embodiment, when the secret code generation application is a wireless communications device, shared secret information is securely stored locally on the wireless communications device. In one embodiment, the shared secret information is encrypted.

The security code generation application must first be activated. In one embodiment, a user input to activate the application is received. For example, a user may select to activate the application by selecting an option on a mobile phone menu. In another embodiment, the activation process is automatically initiated by the security code generation application the first time it is activated.

At block 452, the wireless communications device establishes a secure connection with a validation server. The wireless communications device, in one embodiment, requests the shared secret. In another embodiment, the connection itself is sufficient to trigger the generation of a shared secret.

The validation server sends the shared secret information to the wireless communications device, and at block 454, the shared secret information is received by the wireless device.

At block 456, a credential identifier (ID) is received. In another embodiment, the credential identifier may be generated on the wireless device and sent to the server.

At block 458, the shared secret information and credential ID are securely stored. The shared secret information and credential ID are locally stored on the wireless communications device. The shared secret information and credential ID may be securely encrypted.

At block 460, the wireless communications device synchronizes its clock with the clock on the validation server. During the activation process, a synchronization process may be automatically initiated so that a clock on the wireless communications device is synchronized with a clock on the validation server. In one embodiment, subsequently the process may receive instructions (e.g., via user input) to initiate the process to synchronize clock with the clock on the validation server.

At block 462, a security code is generated using the stored shared secret information and the current time. The security code generated at block 406 may be a first unique security code, that is, it is the first unique security code generated upon detecting launch of the security code generation application on the wireless communications device.

At block 464, the security code generated at block 462 is displayed.

At decision 466, the process determines whether a predefined time has elapsed. In one embodiment, the predefined time is 30 seconds. At decision 466, if a preset time has elapsed, the process returns to generating a security code at block 462. If a preset time has not elapsed, the process continues to decision 468.

At decision 468, the process determines whether to terminate the security code generation application. In one embodiment, the security code generation application is terminated if a user input to terminate the security code generation application is received. At decision 468, if a user input to terminate the security code generation application is not received, the process returns to determining whether a predefined time has elapsed at block 46. At decision 468, if a user input to terminate the security generation application is received, the process ends.

Figure 5:
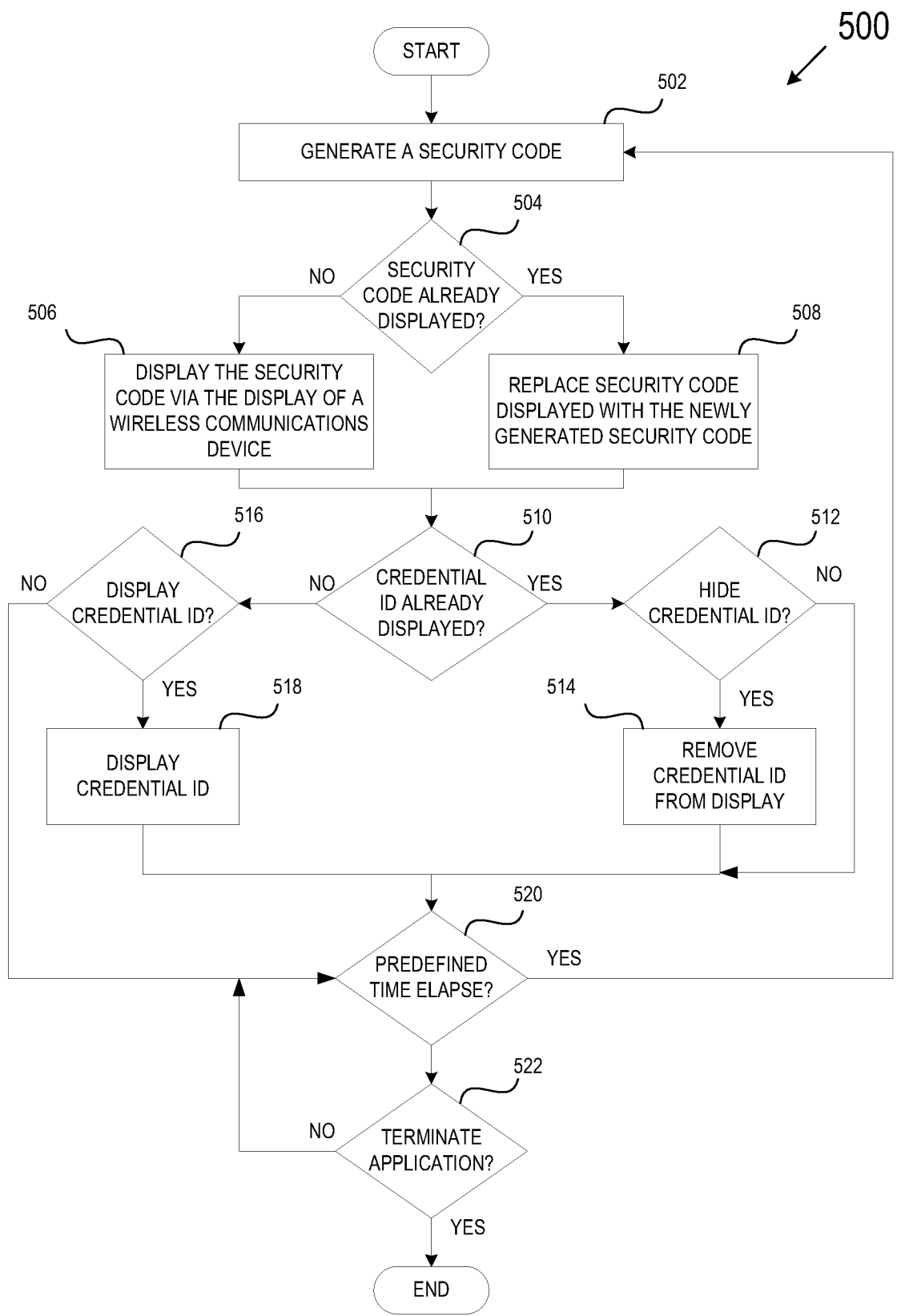
FIG. 5 is a flowchart of another embodiment of generating security codes on a wireless communications device.

FIG. 5 is an overview flowchart of one embodiment of generating security codes on a wireless communications device. At block 502, a security code is generated using shared secret information and time.

At decision 504, the process determines whether a security code is displayed on the wireless communications device. If no security code is currently displayed on the wireless communications device, the security code generated at block 502 is displayed at block 506. At decision 504, if a security code is currently being displayed on the wireless communications device, the process continues to block 508.

At block 508, the security code currently displayed is removed and replaced with the new unique security code generated at block 502.

At decision 510, the process determines whether a credential ID is already displayed on the wireless communications device. In one embodiment, a credential ID is displayed by default.

If at decision 510, a credential ID is displayed, the process determines, at decision 512, whether to hide the credential ID. Since the credential ID is only used at registration, a user may choose to hide the credential ID during normal use. In one embodiment, the default is that the credential ID is hidden. If at decision 512 instructions are received (e.g., via user input) to hide the credential ID, the credential ID is removed from the display device at block 514. If no instructions are received at decision 512 to hide the credential ID, the process continues to decision 520.

At decision 510, if a credential ID is not already displayed, the process determines at decision 516 whether to display the credential ID. If at decision 516 instructions are received (e.g., via user input) to display the credential ID, the credential ID is displayed at block 518. At decision 518, if no instructions are received to display the credential ID, the process continues to decision 520.

At decision 520, the process determines whether a predefined time threshold is met. In one embodiment, the predefined time is 30 seconds. At block 520, if a preset time threshold is met, the process returns to generating a security code at block 502. At block 520, if a preset time has not elapsed (e.g., a preset time threshold is not met), the process continues to decision 522.

At decision 522, the process determines whether to terminate the security code generation application. In one embodiment, the security code generation application is terminated if a user input to terminate the security code generation application is received. At decision 522, if a user input to terminate the security code generation application is not received, the process returns to determining whether a predefined time has elapsed at decision 520. At decision 522, if a user input to terminate the security generation application is received, the process ends.

Figure 6:
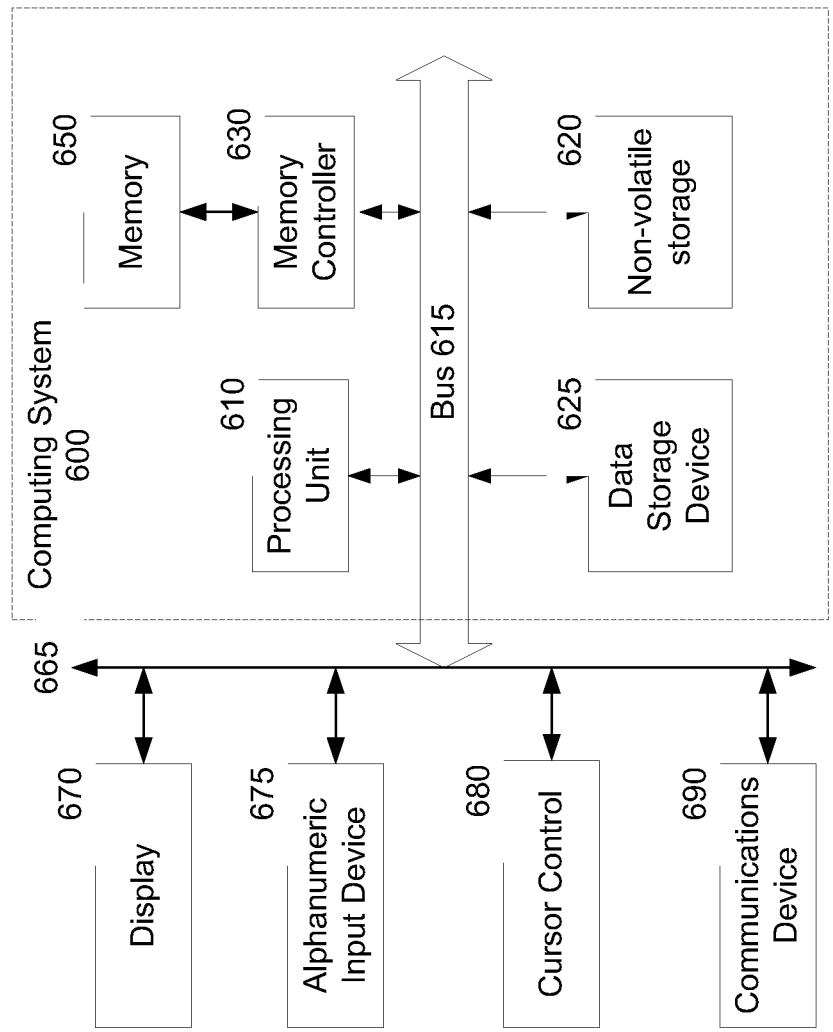
FIG. 6 is one embodiment of a computer system that may be used with the present invention.

FIG. 6 is one embodiment of a computer system that may be used with the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a cathode ray tube (CRT) or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 610. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modification and changes may be made thereto without departing from the broader spirit and scope of the invention as set forth in the appended claims. The specification and drawings are, accordingly, to be regarded in an illustrative rather than a restrictive sense.

The invention claimed is:

1. A computer-implemented method comprising:
   detecting a user input to launch a security code generation application on a wireless communications device;
   receiving shared secret information and a credential identifier from a validation server;
   generating a first unique security code based at least in part on the shared secret information;
   displaying the first unique security code on the wireless communications device;

associating the credential identifier with the first unique security code, wherein the credential identifier to identify the wireless communications device and to validate the first unique security code when the first unique security code is provided to a third-party server;

determining whether to further generate a new unique security code based on time; and for each determination to further generate the new unique security code, generating the new unique security code;

removing the displayed first unique security code from the display device; and automatically displaying the new unique security code.

2. The computer-implemented method of claim 1, wherein determining whether to further generate a new unique security code based on time includes determining whether a predefined time threshold is met.

3. The computer-implemented method of claim 2, wherein the predefined time threshold is 30 seconds.

4. The computer-implemented method of claim 1, wherein determining whether to generate a new unique security code based on time includes receiving instructions to terminate the security code generation application.

5. The computer-implemented method of claim 1, further comprising securely storing secret information used to generate the unique security code.

6. The computer-implemented method of claim 5, wherein generating the unique security code comprises:

retrieving secret information stored on the wireless communications device;

generating the unique security code based on the secret information and time data.

7. The computer-implemented method of claim 1, further comprising securely storing the credential identifier (ID) used to validate the unique security code.

8. The computer-implemented method of claim 7, further comprising:

retrieving the credential ID stored on the wireless communications device; and displaying the credential ID on the display device on the wireless communications device.

9. The computer-implemented method of claim 8, further comprising removing the credential ID from the display device in response to receiving instructions.

10. The computer-implemented method of claim 1, further comprising synchronizing a clock on the wireless communications device with a clock on a validation server.

11. The computer-implemented method of claim 1, further comprising:

receiving a user input to synchronize a clock on the wireless communications device with a clock on a validation server; and synchronizing the clock on the wireless communications device with the clock on the validation server.

12. A wireless communications device comprising:

an application detector to detect a launch of a security code generation application;

a receiver to receive shared secret information and a credential identifier from a validation server;

a security code generator to generate a first unique security code based at least in part on the shared secret information;

an activator to associate the credential identifier with the first unique security code, wherein the credential identifier to identify the wireless communications device and to validate the first unique security code when the first unique security code is provided to a third-party server;

an analysis logic to determine, based on time, whether to generate a new unique security code; and a display device to display a single security code, wherein the first unique security code is replaced by the new unique security code.

13. The computer-implemented method of claim 1, wherein the credential ID is a unique identifier only assigned to the wireless device.

14. The computer-implemented method of claim 1, wherein the credential ID is a unique identifier only assigned to the user.

15. The computer-implemented method of claim 1, further comprising a step of hiding the credential ID in response to a user instruction to hide the credential ID.

16. The wireless communications device of claim 12, further comprising:

a repository to securely store information used to generate and validate the unique security code.

17. The wireless communications device of claim 16, wherein the information securely stored in the repository comprises:

secret information to send to a validation server;

secret information received from the validation server; and a credential identifier (ID) received from the validation server.

18. The wireless communications device of claim 16, further comprising an activator to activate the security code generation application with a validation service comprising:

a data transmitter to send secret information from the security code generation application to a validation server; and a data receiver to receive secret information from the validation server.

19. The wireless communications device of claim 12, wherein the analysis logic comprises:

a timer logic to monitor a time elapsed from when a security code was generated;

a comparison logic to determine whether a predefined time threshold is met, and the analysis logic to trigger the further generating of the unique security code when the predefined time threshold is met.

20. The wireless communications device of claim 12, wherein the analysis logic comprises:

a display logic, to determine whether to display the credential ID on the display device, the analysis logic to trigger displaying the credential ID when instructions to display the credential ID are received, and to trigger removing the credential ID when instructions to remove the credential ID are received.

21. The wireless communications device of claim 12, further comprising a synchronizer, to synchronize a clock on the wireless communications device with a clock on a validation server.

22. The wireless communications device of claim 21, wherein the synchronizer synchronizes the clock on the wireless communications device with the clock on the validation server upon receiving instructions.

23. A security system comprising:

an application detector to detect a launch of a security code generation application;

a receiver to receive shared secret information and a credential identifier from a validation server;

a security code generator to generate a first unique security code based at least in part on the shared secret information;

an activator to associate the credential identifier with the first unique security code, wherein the credential identifier to identify the wireless communications device and to validate the first unique security code when the first unique security code is provided to a third-party server;
an analysis logic to determine, based on time, whether to generate a new unique security code;
a security code display to display the first unique security code; and a time indicator to display time in reference to a predefined time threshold; and
a credential ID display to display the credential identifier received from a validation server.

24. The security system of claim 23, wherein the security code display displays the new unique security code when time expires in reference to a predefined time threshold.

25. The security system of claim 23, further comprising:
a display logic, to determine whether to display a credential ID; and
the analysis logic to trigger displaying the credential ID when instructions to display the credential ID are received, and to trigger removing the credential ID when instructions to remove the credential ID are received.

26. A computer-implemented method comprising:
displaying a first unique security code on a wireless communications device;
associating a credential identifier with the first unique security code, wherein the credential identifier to identify the wireless communications device and to validate the first unique security code when the first unique security code is provided to a third-party server;
displaying time in reference to a predefined time threshold;
determining whether the predefined time threshold is met;
replacing the first unique security code on the wireless communications device with a new security code when the predefined time threshold is met; and
displaying the credential identifier received from the validation server.

* * * * *